United States Patent
Eslami Sarab

(10) Patent No.: US 9,842,026 B2
(45) Date of Patent: Dec. 12, 2017

(54) SNAPSHOT-PROTECTED CONSISTENCY CHECKING FILE SYSTEMS

(71) Applicant: NetApp, Inc., Sunnyvale, CA (US)

(72) Inventor: Farshid Eslami Sarab, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 716 days.

(21) Appl. No.: 14/145,797

(22) Filed: Dec. 31, 2013

(65) Prior Publication Data

US 2015/0186217 A1 Jul. 2, 2015

(51) Int. Cl.
*G06F 17/30* (2006.01)
*G06F 11/14* (2006.01)

(52) U.S. Cl.
CPC ...... *G06F 11/1446* (2013.01); *G06F 11/1435* (2013.01); *G06F 11/1448* (2013.01); *G06F 2201/82* (2013.01); *G06F 2201/84* (2013.01)

(58) Field of Classification Search
CPC ............. G06F 11/1435; G06F 11/1446; G06F 11/1448; G06F 2201/82; G06F 2201/84; G06F 17/30067
See application file for complete search history.

(56) References Cited

U.S. PATENT DOCUMENTS

| | | | |
|---|---|---|---|
| 5,819,292 A | 10/1998 | Hitz et al. | |
| 6,205,450 B1 * | 3/2001 | Kanome | G06F 11/1435 707/649 |
| 7,313,720 B1 | 12/2007 | Eng et al. | |
| 7,475,098 B2 | 1/2009 | Patterson et al. | |
| 7,574,464 B2 | 8/2009 | Hitz et al. | |
| 7,873,700 B2 | 1/2011 | Pawlowski et al. | |
| 2010/0042802 A1 * | 2/2010 | Helman | G06F 3/0605 711/173 |
| 2011/0106764 A1 * | 5/2011 | Wu | G06F 11/1458 707/639 |

\* cited by examiner

*Primary Examiner* — Dinku Gebresenbet
(74) *Attorney, Agent, or Firm* — Cooper Legal Group, LLC

(57) ABSTRACT

Various of the disclosed embodiments provide for recovery following inadvertent errors in a Log-Structured File System (LSFS). Particularly, embodiments mitigate inadvertent errors introduced by a file system consistency check operation by creating file system images at an appropriate time. The images may be stored within the portion of the file system accessible to a user. The images may be created in conjunction with the mounting of the file system and in such a fashion as to preserve the file system data should an error occur. Restoring the system to one of the images may remove any errors introduced by the consistency check, or similar, operation.

21 Claims, 14 Drawing Sheets

US 9,842,026 B2

SNAPSHOT-PROTECTED CONSISTENCY CHECKING FILE SYSTEMS

TECHNICAL FIELD

Various of the disclosed embodiments relate to systems and methods for recovering from inadvertent errors during a file system consistency check operation in a log-structured file system.

BACKGROUND

A Log-Structured File System (LSFS) is a file system which writes data and/or metadata sequentially to a buffer. As write, delete, and other requests which modify data are received at the LSFS, the LSFS will allocate new memory blocks and create new copies of the adjusted data, while retaining the previous copy of the unadjusted data. In this manner, the LSFS retains copies of past versions of files while introducing modifications in new memory. A storage system implementing an LSFS may include one or more storage devices configured to receive information and from which information may be obtained. The LSFS may be implemented in accordance with various storage architectures, e.g., a network-attached storage environment, a storage area network and a disk assembly directly attached to a client or host computer. An example of an LSFS that is also a write-anywhere file system that is configured to operate on a storage system is the Write Anywhere File Layout (WAFL®) file system available from Network Appliance, Inc., of Sunnyvale, Calif.

The LSFS may include a consistency check program (e.g. Unix fsck, WAFL Wafliron, etc.) that makes changes to the file system to correct inconsistencies therein. In many instances, users cannot verify the consistency of their data until after the consistency check program has completed. By that time, the consistency check program's changes may have been implemented upon the file system and may be irreversible. If the consistency check program has made any errors or introduced even further inconsistencies, the user will be without remedy to correct them. This may be particularly troublesome in an LSFS where the LSFS, by design, does not permit the user access to the retained copies of file data prior to its modification. Thus, despite the regular retention of historical data, the LSFS may render such data inaccessible for recovery purposes.

Additionally, many consistency check programs store their temporary run-time data on disks, possibly disks on a different file system than the one being checked. When there is no other file system available upon which to store this data (e.g., in single aggregate systems), these programs may save the data upon the same file system being checked. This approach can be dangerous, as the blocks allocated to user data can be inadvertently used by the consistency check program for its temporary data. The consistency check program may overwrite valuable user-data. However, setting aside a dedicated local storage to be used by the file system check program may be costly and inefficient.

Accordingly, there exists a need for a system facilitating file system consistency checks in an LSFS without jeopardizing the integrity of user data. A new approach for converting the on-disk image of the file system to safe and recoverable format prior to the consistency check is desired.

BRIEF DESCRIPTION OF THE DRAWINGS

One or more embodiments of the present disclosure are illustrated by way of example and not limitation in the accompanying figures, in which like references indicate similar elements.

DETAILED DESCRIPTION

Figure 1:
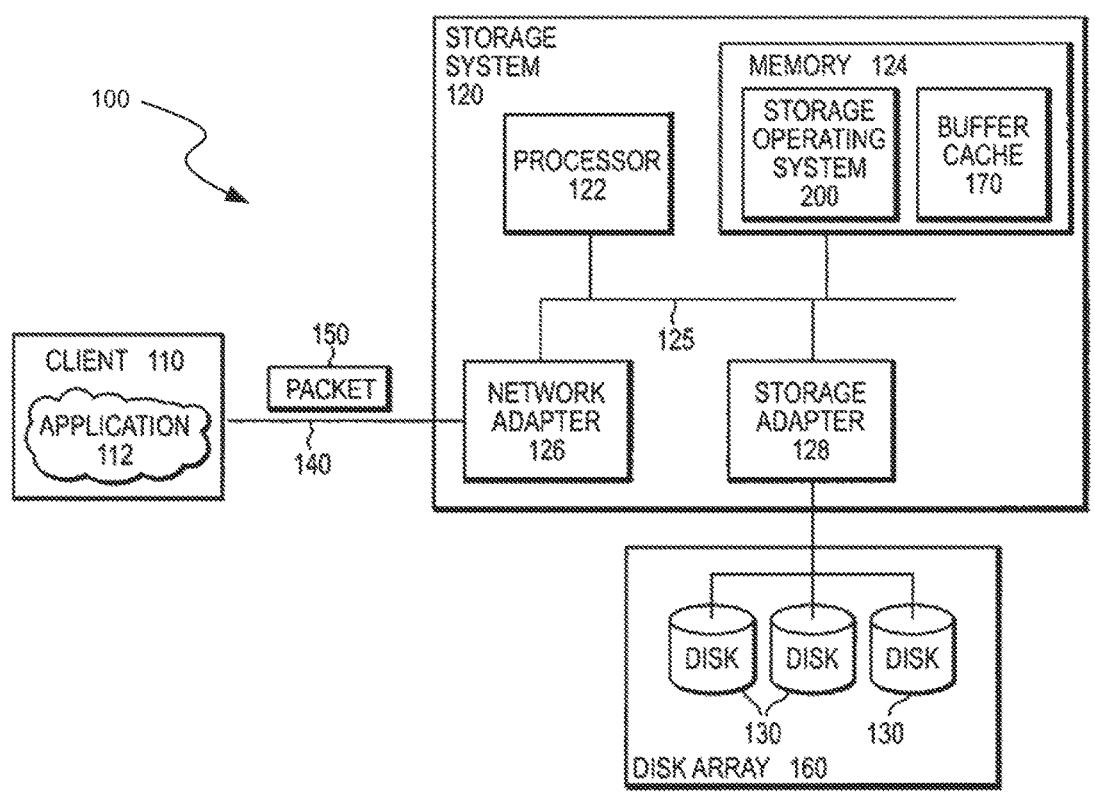
FIG. 1 is a schematic block diagram of an environment including a storage system that may be advantageously used with some of the present embodiments.

Various of the disclosed embodiments describe a snapshot image of a file system and its use in preventing data loss during a consistency check. A "snapshot" as referred to herein is an image of a file system that existed at a specified time, e.g., a time when the snapshot was created. In some embodiments, a "snapshot" may refer to a Netapp Snapshot™ which creates a point-in-time copy of a file system, though one will recognize that other, more general snapshot forms are also possible. The snapshot image may be read-only in some embodiments. By converting the on-disk image of a file system to a snapshot, the snapshot preserves the on-disk image of the file system before the consistency check program changes it. Reverting to snapshots may enable all fixes/changes by the program to the file system to be reverted. In various embodiments, the disclosed technology may store the created snapshot in the "active" file system rather than outside the active file system. The active file system is the file system that is presently in use. In this manner, various embodiments may accommodate various size and operational ordering limitations while improving consistency and mitigating errors.

Various of the disclosed embodiments may reduce the personnel time required to deal with file system data recovery following a consistency check. Embodiments may also reduce the down-time of data storage and the number of cases where customers need to restore their file system from their secondary backup. Some embodiments may be especially useful for the online file system check program(s), where the administrators and customer support department do not have control on what changes the program makes to the file system. Using some of the disclosed embodiments, users can reject the changes to the file system made by the file system consistency check program by restoring to the snapshot.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Several embodiments of the disclosed technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives, solid state drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media. For purposes of illustration, the following disclosure may make regular reference to WAFL, but one skilled in the art will regularly understand that the disclosed relationships and processes can be accomplished in other file systems in a similar or the same manner.

LSFS and Device Overview

FIG. 1 is a schematic block diagram of an environment 100 including a storage system 120 that may be advantageously used with various of the present embodiments. The storage system may be a computer that provides a storage service relating to the organization of information on storage devices, such as disks 130 (or solid state drives) of a disk array 160. The storage system 120 may comprise a processor 122, a memory 124, a network adapter 126 and a storage adapter 128 interconnected by a system bus 125. The storage system 120 may also include a storage operating system 200 that may implement a high-level module, such as a file system, to logically organize information as a hierarchical structure of directories, files and special types of files called virtual disks (hereinafter "blocks") on the disks.

In the illustrative embodiment, the memory 124 may comprise storage locations that are addressable by the processor and adapters for storing software program code. A portion of the memory may be further organized as a "buffer cache" 170 for storing data structures associated with certain of the present embodiments. The processor and adapters may, in turn, comprise processing elements and/or logic circuitry configured to execute the software code and manipulate the data structures. Storage operating system 200, portions of which may be resident in memory and executed by the processing elements, may functionally organize the system 120 by, inter alia, invoking storage operations executed by the storage system. It will be apparent to those skilled in the art that other processing and memory means, including various computer readable media, may be used for storing and executing program instructions pertaining to the various embodiments described herein.

The network adapter 126 may comprise the mechanical, electrical and signaling circuitry needed to connect the storage system 120 to a client 110 over a computer network 140. Computer network 140 may comprise a point-to-point connection or a shared medium, such as a local area network. Illustratively, the computer network 140 may be embodied as an Ethernet network or a Fiber Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system 120, and the storage system 120 may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. In some embodiments, the client may issue packets including block-based access protocols, such as the Small Computer Systems Interface (SCSI) protocol encapsulated over TCP (iSCSI) and SCSI encapsulated over Fiber Channel (FCP), when accessing information in the form of blocks.

The storage adapter 128 may cooperate with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information may be stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 may be implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system may be organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations (and even non-RAID implementations) may be used in accordance with the inventive principles described herein.

To facilitate access to the disks 130, the storage operating system 200 may implement a write-anywhere file system that cooperates with virtualization modules to "virtualize" the storage space provided by disks 130. The file system may logically organize the information as a hierarchical structure of named directories and files on the disks. Each "on-disk" file may be implemented as a set of disk blocks configured to store information, such as data, whereas the directory may be implemented as a specially formatted file in which names and links to other files and directories are stored. The virtualization modules may allow the file system to further logically organize information as a hierarchical structure of blocks on the disks that are exported as named logical unit numbers (LUNs).

In the illustrative embodiment, the storage operating system may be the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of the disclosed embodiments.

Figure 2:
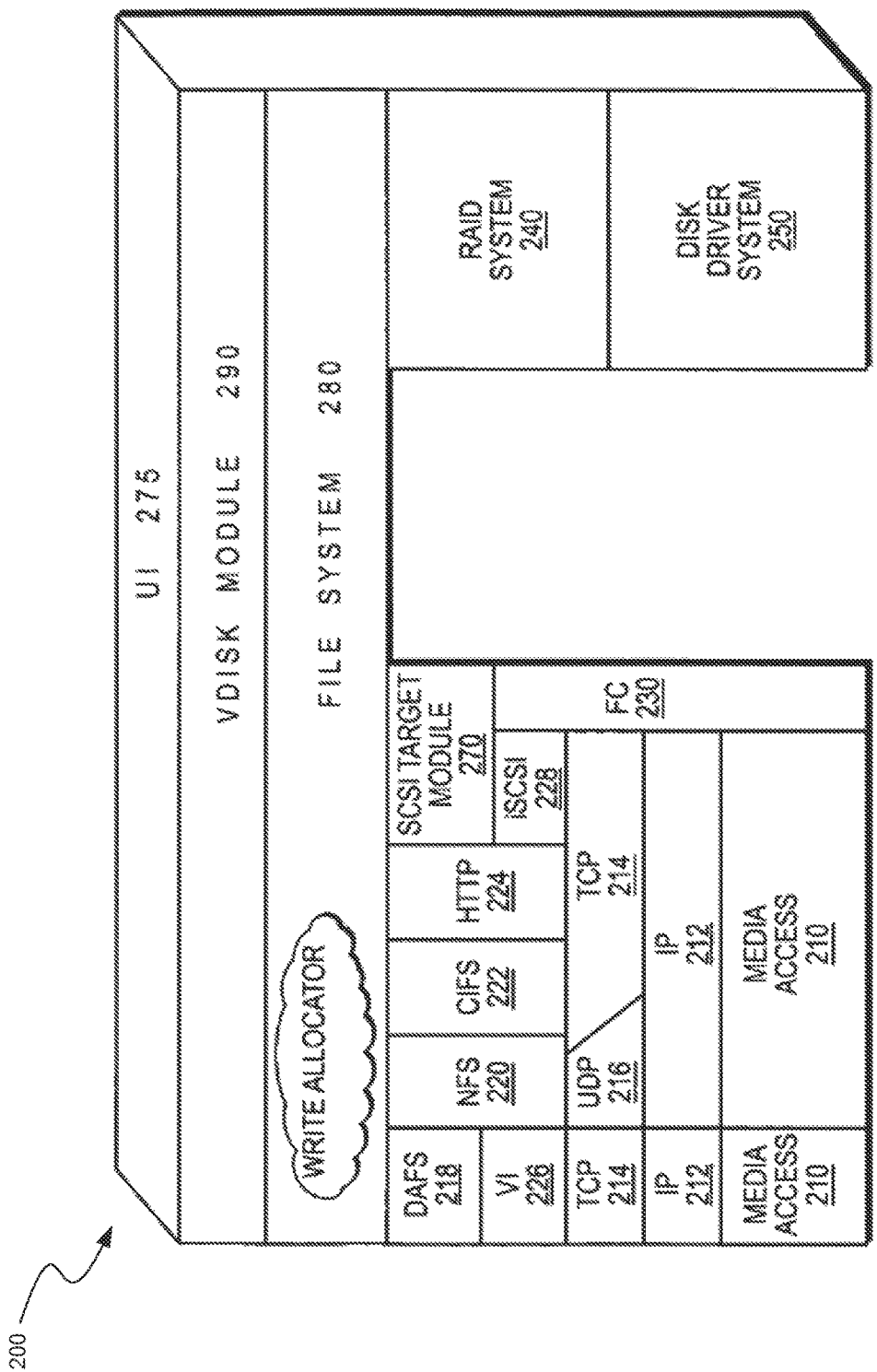
FIG. 2 is a schematic block diagram of a storage operating system that may be advantageously used with some of the present embodiments.

FIG. 2 is a schematic block diagram of the storage operating system 200 that may be advantageously used with some of the presently disclosed embodiments. The storage operating system may comprise a series of software layers organized to form an integrated network protocol stack or, more generally, a multi-protocol engine that provides data paths for clients to access information stored on the storage system using block and file access protocols. The protocol stack may include a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer may provide multi-protocol file access and, to that end, may include support for the Direct Access File System (DAFS) protocol 218, the NFS protocol 220, the CIFS protocol 222 and the Hypertext Transfer Protocol (HTTP) protocol 224. A VI layer 226 may implement the VI architecture to provide direct access transport (DAT) capabilities, such as RDMA, as required by the DAFS protocol 218.

An iSCSI driver layer 228 may provide block protocol access over the TCP/IP network protocol layers, while a FC driver layer 230 may receive and transmit block access requests and responses to and from the storage system. The FC and iSCSI drivers may provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system may include a storage module embodied as a RAID system 240 that manages the storage and retrieval of information to and from the volumes/disks in accordance with I/O operations, and a disk driver system 250 that implements a disk access protocol such as, e.g., the SCSI protocol.

In some embodiments, bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 may be layered on the file system 280 to enable access by administrative interfaces, such as a user interface (UI) 275, in response to a user (system administrator) issuing commands to the storage system. The SCSI target module 270 may be disposed between the FC and iSCSI drivers 228, 230 and the file system 280 to provide a translation layer of the virtualization system between the block (LUN) space and the file system space, where LUNs are represented as blocks. The UI 275 may be disposed over the storage operating system in a manner that enables administrative or user access to the various layers and systems.

The file system may be illustratively a message-based system that provides logical volume management capabilities for use in access to the information stored on the storage devices, such as disks. That is, in addition to providing file system semantics, the file system 280 may provide functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system may use file to store metadata describing the layout of its file system; these metadata files may include, among others, an inode file. A file handle, e.g., an identifier that includes an inode number, may be used to retrieve an inode from disk.

Broadly stated, all inodes of the write-anywhere file system may be organized into an inode file. A file system info block may specify the layout of information in the file system and may include an inode of a file that includes all other inodes of the file system. Each logical volume (file system) may have a FILE SYSTEM info block that may be preferably stored at a fixed location within, e.g., a RAID group. The inode of the root FILE SYSTEM info block may directly reference (point to) blocks of the inode file or may reference indirect blocks of the inode file that, in turn, reference direct blocks of the inode file. Within each direct block of the inode file may be embedded inodes, each of which may reference indirect blocks that, in turn, reference data blocks of a file.

Operationally, a request from the client 110 may be forwarded as a packet 150 over the computer network 140 and onto the storage system 120 where it is received at the network adapter 126. In some embodiments, a network driver (of layer 210 or layer 230) processes the packet and, if appropriate, passes it on to a network protocol and file access layer for additional processing prior to forwarding to the write-anywhere file system 280. Here, the file system may generate operations to load (retrieve) the requested data from disk 130 if it is not resident "in core", e.g., in the buffer cache 170. If the information is not in the cache, the file system 280 may index into the inode file using the inode number to access an appropriate entry and retrieve a logical vbn. The file system may then pass a message structure including the logical vbn to the RAID system 240; the logical vbn may be mapped to a disk identifier and disk block number (disk,dbn) and sent to an appropriate driver (e.g., SCSI) of the disk driver system 250. The disk driver may access the dbn from the specified disk 130 and may load the requested data block(s) in buffer cache 170 for processing by the storage system. Upon completion of the request, the storage system (and operating system) returns a reply to the client 110 over the network 140.

It should be noted that the software "path" through the storage operating system layers described above to perform data storage access for the client request received at the storage system may alternatively be implemented in hardware in some embodiments. In some embodiments, a storage access request data path may be implemented as logic circuitry embodied within a field programmable gate array (FPGA) or an application specific integrated circuit (ASIC). This type of hardware implementation may increase the performance of the storage service provided by storage system 120 in response to a request issued by client 110. Moreover, in some embodiments, the processing elements of adapters 126, 128 may be configured to offload some or all of the packet processing and storage access operations, respectively, from processor 122, to thereby increase the performance of the storage service provided by the system. It is expressly contemplated in some embodiments that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. The storage operating system may also be implemented as an application program operating over a general-purpose operating system, such as UNIX® or Windows NT®, or as a general-purpose operating system with configurable functionality, which is configured for storage applications as described herein.

In addition, it will be understood to those skilled in the art that some of the embodiments described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with some of the present embodiments is described in U.S. patent application Ser. No. 10/215,917 titled, Multi-Protocol Storage Appliance that provides Integrated Support for File and Block Access Protocols, filed on Aug. 8, 2002. Moreover, the teachings of the disclosed embodiments can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems.

Figure 3:
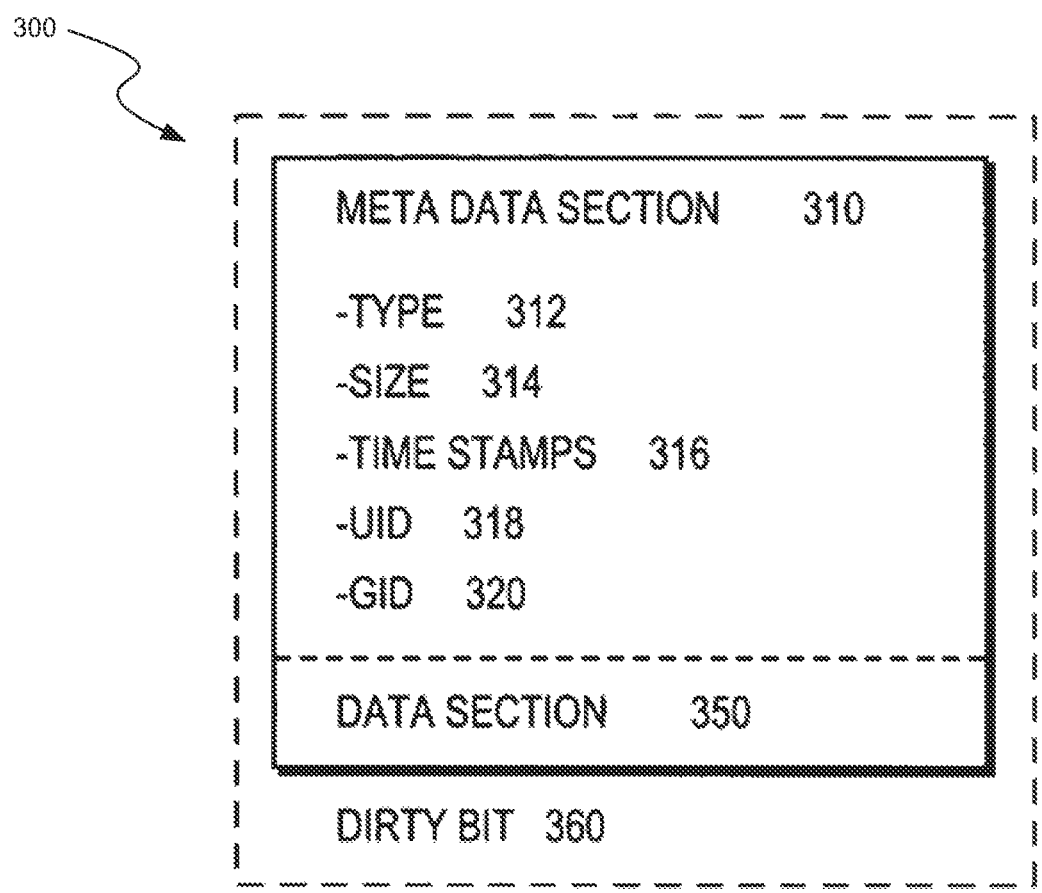
FIG. 3 is a schematic block diagram of an inode that may be advantageously used with some of the present embodiments.

In an illustrative embodiment, a file is represented in the write-anywhere file system as an inode data structure adapted for storage on the disks 130. FIG. 3 is a schematic block diagram of an inode 300, which may include a metadata section 310 and a data section 350. The information stored in the metadata section 310 of each inode 300 may describe the file and, as such, may include the type (e.g., regular, directory, virtual disk) 312 of file, the size 314 of the file, time stamps (e.g., access and/or modification) 316 for the file and ownership, e.g., user identifier (UID 318) and group ID (GID 320), of the file. The contents of the data section 350 of each inode, however, may be interpreted differently depending upon the type of file (inode) defined within the type field 312. For example, the data section 350 of a directory inode may contain metadata controlled by the file system, whereas the data section of a regular inode may contain file system data. In this latter case, the data section 350 may include a representation of the data associated with the file.

In some embodiments, the data section 350 of a regular on-disk inode may include file system data or pointers, the latter referencing 4 kB data blocks on disk used to store the file system data. Each pointer may be a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) may comprise up to 16 pointers, each of which references a 4 kB block of data on the disk.

Moreover, if the size of the data is greater than 64 kB but less than or equal to 64 megabytes (MB), then each pointer in the data section 350 of the inode (e.g., a second level inode) may reference an indirect block (e.g., a first level block) that contains 1024 pointers, each of which references a 4 kB data block on disk. In some embodiments, for file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block may in turn contain 1024 pointers, each of which references a 4 kB data block on disk. When accessing a file, each block of the file may be loaded from disk 130 into the buffer cache 170.

In some embodiments, when an on-disk inode (or block) is loaded from disk 130 into buffer cache 170, its corresponding in-core structure may embed the on-disk structure. For example, the dotted line surrounding the inode 300 (FIG. 3) may indicate the in-core representation of the on-disk inode structure. The in-core structure may be a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data may be marked "dirty" using the dirty bit 360 so that the inode (block) can be subsequently "flushed" (stored) to disk. The in core and on-disk format structures of the WAFL file system, including the inodes and inode file, are disclosed and described in U.S. Pat. No. 5,819,292 titled Method for Maintaining Consistent States of a File System and for Creating User-Accessible Read-Only Copies of a File System by David Hitz et al., issued on Oct. 6, 1998.

Figure 4:
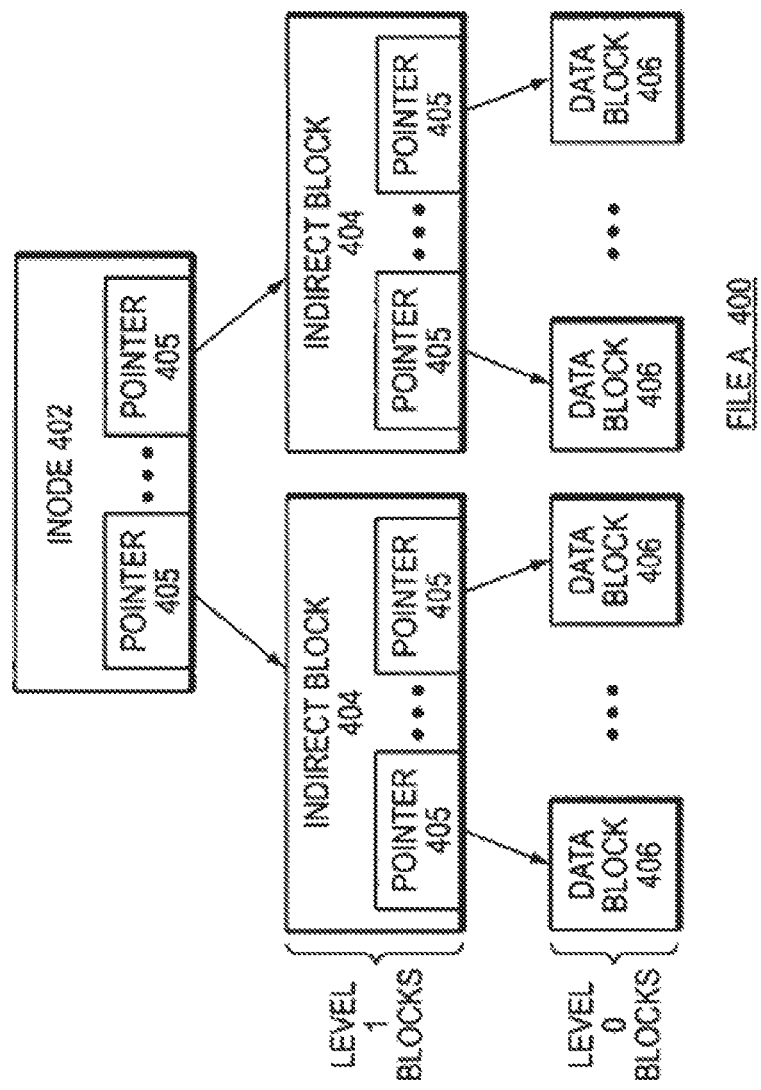
FIG. 4 is a schematic block diagram of a buffer tree of a file that may be advantageously used with some of the present embodiments.

FIG. 4 is a schematic block diagram of a buffer tree of a file that may be advantageously used with the disclosed technology. The buffer tree is an internal representation of blocks for a file (e.g., file A 400) loaded into the buffer cache 170 and maintained by the write-anywhere file system 280. A root (top-level) inode 402, such as an embedded inode, references indirect (e.g., level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each level 1 indirect block 404 may contain pointers to as many as 1024 data blocks. According to the "write anywhere" nature of some file systems, these blocks may be located anywhere on the disks 130.

LSFS Behavior and Consistency Checkpoints

Figure 5:
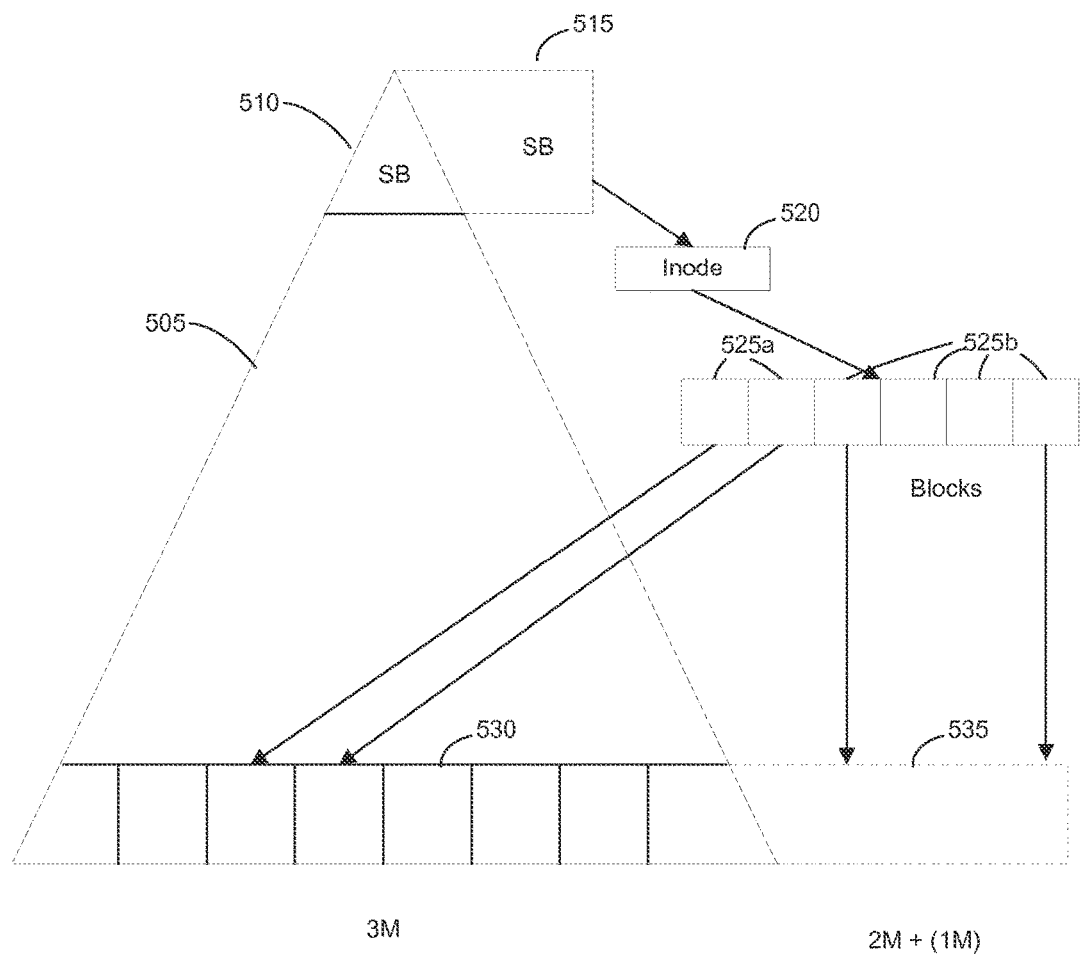
FIG. 5 is a block diagram illustrating the creation of a consistency point within an LSFS as may occur in some embodiments.

FIG. 5 is a block diagram illustrating the creation of a consistency checkpoint within an LSFS as may occur in some embodiments. The LSFS may batch one or more changes to the file system and create a new representation of the changed material as a consistency checkpoint. For example, following receipt of a data operation, such as writing to a portion of a file, the LSFS may retain references to the unaffected portions of the file, but may create new references to the adjusted portions.

In a hierarchy 505, a superblock (also referred to herein as "FSinfo" or "FSinfo block") 510 may reference a plurality of inodes, which in turn reference indirect blocks, which in turn reference data 530. Examples of such structures may also be found, e.g., in U.S. Pat. Nos. 6,988,220, 7,574,464, 7,475,098. The data 530 may consume, e.g., 3 MB of space. Following a change to a portion of the data, the LSFS may create a consistency point by creating a new superblock 515, which may reference a new inode 520, which may itself reference newly created indirect blocks 525*a-b*. Some of the indirect blocks 525*a* may reference the original, unmodified data 520, while some of the indirect blocks 525*b* may reference new modified data 535. The addition of blocks 525 may have expanded the memory footprint 535 by 3 MB. If, as in the depicted example, the capacity of the storage is only 5 MB, the excess of 1 MB may prevent the creation of a new consistency checkpoint and the LSFS will need to reallocate space, seek additional storage, or perform garbage collection to acquire more space.

Ideally, one may like to create a backup "snapshot" of the file system by retaining the data associated with a consistency checkpoint for future reference. Unfortunately, various of the new 535 and previously allocated 530 data may be inaccessible to the user under the LSFS architecture. Accordingly, various embodiments contemplate methods for repurposing the consistency checkpoint procedure to create "snapshots", where the user may access the older version of the data and not only new indirect blocks 525*b*. In this manner, should the superblock be corrupted following a consistency check, the user can revert to an unaffected version of the file system by restoring the snapshot.

Snapshot Protected Consistency Checks

Figure 6:
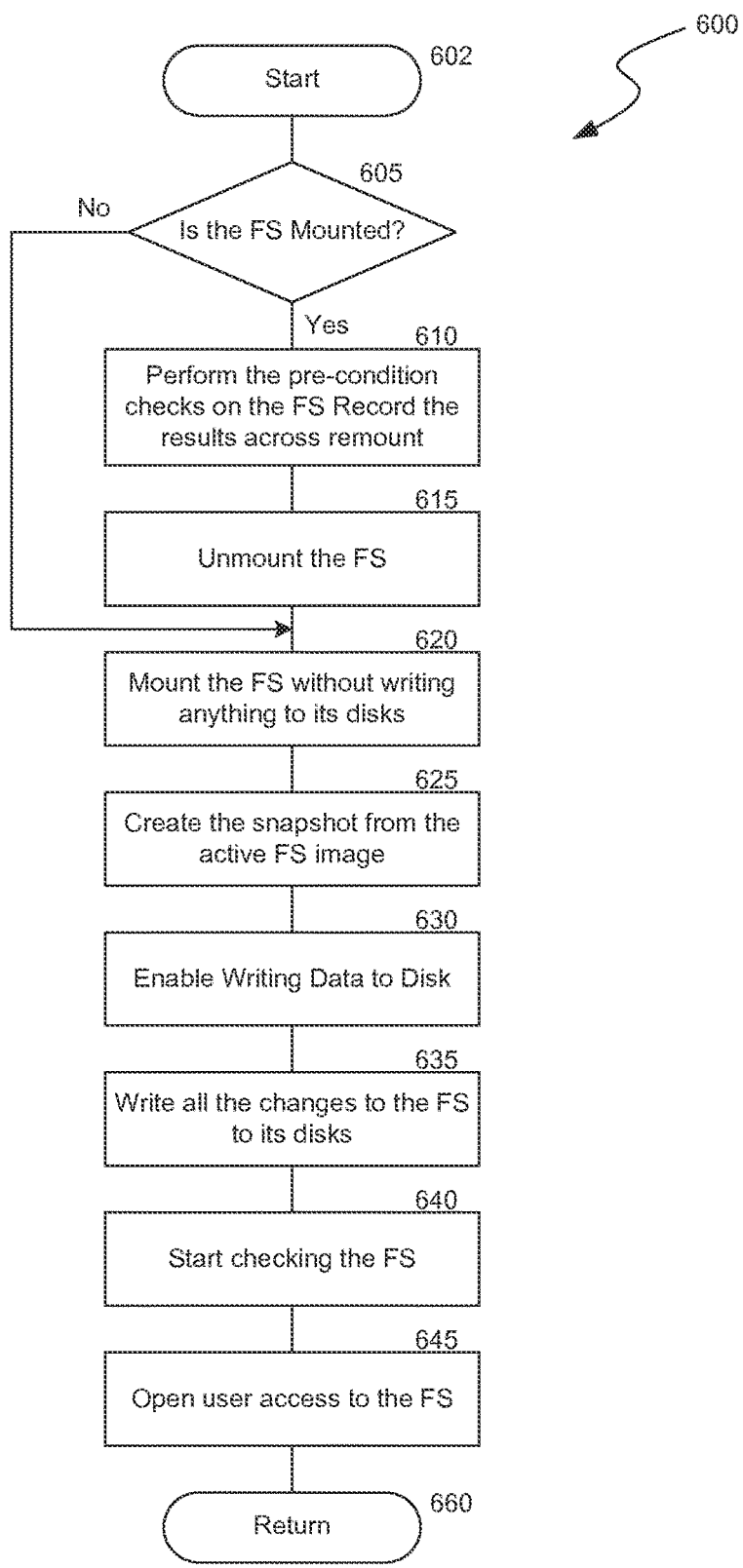
FIG. 6 is a flow diagram illustrating a routine for creating a snapshot and performing a snapshot-protected file consistency check as may be implemented in some embodiments.

FIG. 6 is a flow diagram illustrating a routine 600 for creating a snapshot and performing a snapshot-protected file system consistency check as may be implemented in some embodiments. The process may begin at block 602 by determining whether the file system is mounted or unmounted at decision block 605. If the file system is mounted, various pre-conditions can be verified, e.g. at block 610 to ensure that the system is prepared for snapshot creation. These pre-conditions may take the form of rules which may be applied to confirm various states of hardware/software. For example, the rules may include:

Checking for free disk space, e.g., to ensure there is enough space for creating a snapshot;

Checking for a valid volume type;

Checking if the file system check is a "special mode" form that checks a previous stable file system image. For that mode, the snapshot will not be created.

Checking if there will be snapshots with duplicate checkpoint generation numbers if the system proceeds to convert the current on-disk file system image to a snapshot (in some embodiments, snapshots with duplicate generation numbers may not be supported); and Checking if there is already a snapshot created by this method, and if the user wants to create a new one again (e.g., the user must confirm that they want to delete the previous snapshot and create a new one).

Following the pre-check the system may unmount the file system at block 615, e.g., to commit changes, close locks, stop usage, etc. In some embodiments, these operations may be postponed until the file system is re-mounted. If the file system is mounted, the result of these checks may be consistent following the re-mount process of the file system and so they may be used when the file system becomes mounted again.

At block 620 the file system may undergo its mounting process, e.g. the on-disk meta-data of the file system are read and in-core structures created for the file system to be accessible to the users and processes. In some embodiments, no part of the LSFS' on-disk data is allowed to change during the mounting process. The LSFS may include Aggregate or Flexible Volumes. An Aggregate volume may consist of one or more RAID groups and a Flexible Volume may comprise a virtualized file volume (e.g., a Netapp FlexVol®) or a logical volume which may be resized. During the mounting process, neither Aggregate nor Flexible Volumes may not participate in a consistency checkpoint in some embodiments. This restriction may be imposed to ensure that the process of converting the on-disk image of the file system to a snapshot is atomic, e.g. either all of the changes to create the new snapshot appear on disk, or none of them do in case of system crash during the process. In some embodiments, any and all objects of the file system may also be checked for consistency before being used. This may be performed to ensure that no part of the file system will be left unchecked, and also that no new modification to the file system is based on the inconsistent data.

At block 625, the on-disk file system image may be converted to a snapshot and added to the list of known and valid snapshots of the file system in the next step. The details of this process are explained in greater detail below with respect to FIG. 12. Generally, snapshot creation involves copying the superblock of the consistency checkpoint, storing the copied superblock in accessible user space, and assigning an appropriate name to the snapshot.

After the snapshot is created and set up, writing to the disks of the file system may be re-enabled in some embodiments at block 630. This may allow all the changes to the file system, including the ones to create the snapshot, to be written to disk. The LSFS may participate in consistency check processing again, following this block.

At block 635, the system may write all the file system changes to disk. In some embodiments this may occur as preliminary part of the regular consistency check process. A consistency check is a point at which storage activity is committed to disk, e.g., from transaction logs that may store data temporarily. Such a consistency check may be triggered, inter alia, after a file system (Aggregate or Flexible Volume) finishes the mounting process.

At block 640, the consistency check program may be initiated to start checking the file system. The consistency check program may take a long time to finish and may depend upon the file system size and the workload on the system. For example, in some systems it can take from minutes to days to finish. At block 645, the system may open the file system to users and processes to access the file system, before concluding 660.

Those skilled in the art will appreciate that the logic illustrated in FIG. 6 and described above, and in each of the flow and sequence diagrams discussed herein, may be altered in a variety of ways. For example, the order of the logic may be rearranged, sub-blocks may be performed in parallel, illustrated logic may be omitted, other logic may be included, etc.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

Snapshot Protection Timeline

Figure 7:
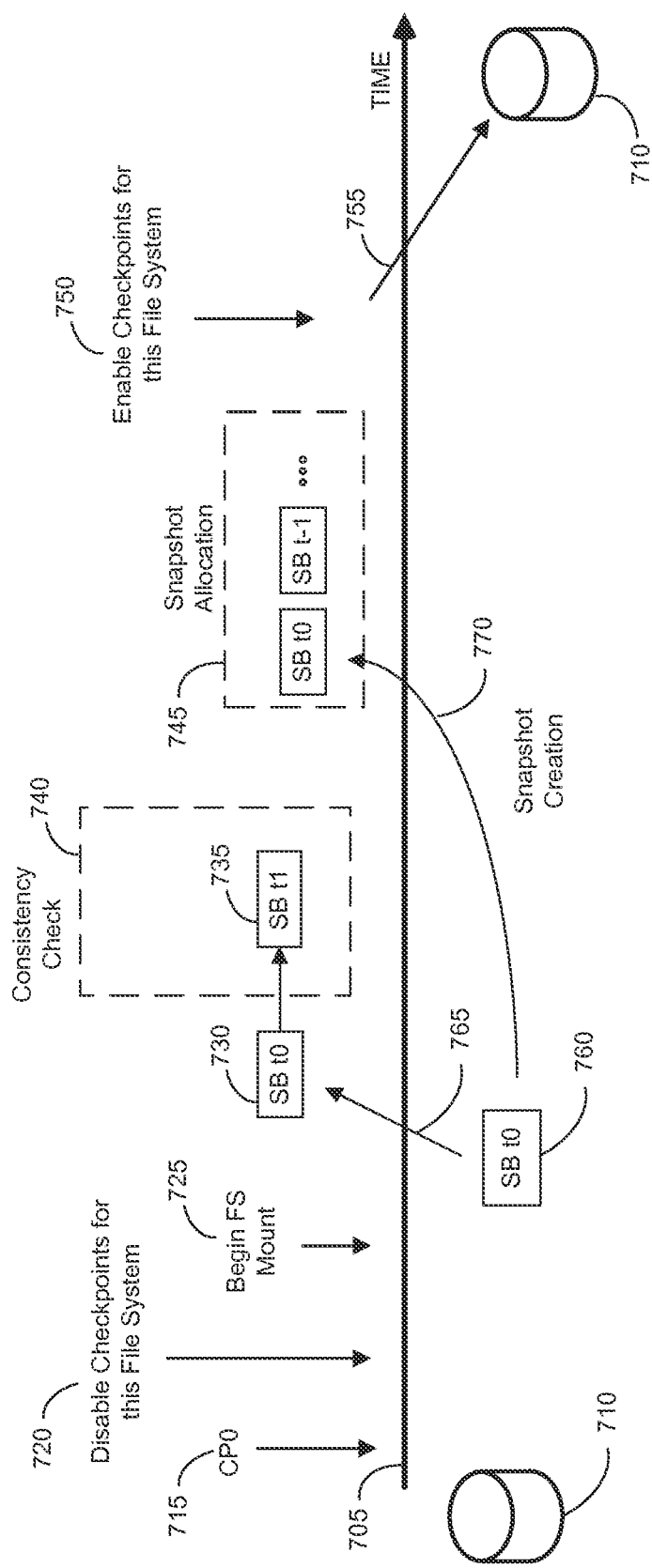
FIG. 7 is a timeline illustrating events and/or operations in the mounting, snapshot creation, and consistency checking of a file system on a disk as may be implemented in some of the embodiments.

FIG. 7 is a timeline illustrating events and/or operations in the mounting, snapshot creation, and consistency checking of a file system on a disk 710 as may be implemented in some of the embodiments. In various embodiments, consistency checking may also be performed on solid state drivers (SSDs). In the disclosed process, snapshots are created and consistency checks performed such that the system may recover if errors are inadvertently introduced. Various of the depicted operations may store the created snapshot in the "active" file system (the file system presently in use) rather than outside the active file system so that it may be accessible to the user during recovery. In this manner, various embodiments may accommodate various size and operational ordering limitations while improving consistency and mitigating errors.

As time 705 progresses, consistency checkpoints may regularly occur in the file system. For example, a checkpoint CP0 may occur at time 715. At time 720 the system may disable checkpoints for the file system and at time 725 the system may begin mounting the file system.

Superblock SB t0 760 stored on the disk 710 may be read 765 into memory as a block in memory 730. In parallel, or at approximately this time, the storage system may also create 770 a snapshot of superblock SB t0 760 and store the snapshot among other snapshots in an allocated portion 745 of the active file system. A consistency check 740 may then be performed, creating a modified version of the superblock SB t1 735 as a result of the various consistency modifications. The system administrator, a user, or a program, may determine if the consistency check generated any data loss in superblock SB t1 735 and revert to one of the stored snapshots in allocation 745 as desired. Once the operations are complete, checkpoints may be again enabled at time 750. Thereafter, if no errors were found, the superblock SB t1 may be written back 755 to the disk 710.

Although FIG. 7 illustrates a specific sequence of operations in various embodiments, one will recognize that variations in the disclosed steps may occur without affecting their substantive effect.

Snapshot Creation

Figure 8:
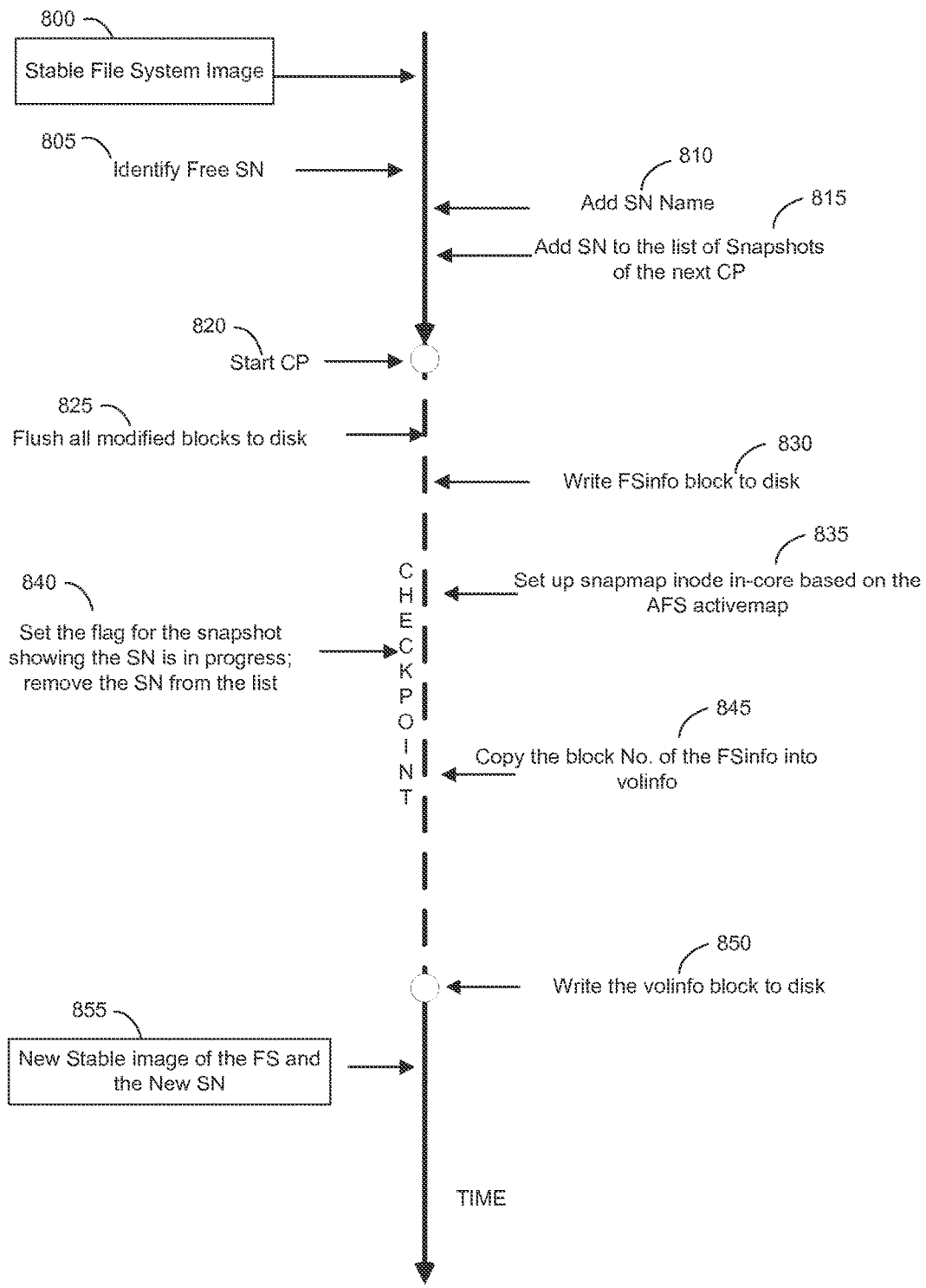
FIG. 8 is an example timeline for snapshot creation as may be implemented in some prior art systems.

FIG. 8 is an example timeline for snapshot creation as may be implemented in some prior art systems. An example of a prior art snapshot system may be found in, e.g., U.S. Pat. No. 7,475,098, the contents of which are incorporated herein by reference in their entirety.

At time 800 there exists a current, stable file system image on disk. At time 805 the process of creating the snapshot begins. At this time, the file system searches the array of FSinfo entries in the Volinfo block for an unused slot. The index of the slot is then used as the "snapshot number" to be created. In some systems, the slot No. 0 is always reserved for the active file system (AFS for short). For example, if a file system has 3 sequentially created snapshots, the first 4 slots of the fsinfo array in the volinfo block would be allocated as follows: the first for the AFS, and the next three sequential slots for the snapshots. The remaining slots in the array may be unused, so the next snapshot may be allocated to any of them.

At time 810 the name of the snapshot is added to the list of snapshots. WAFL, e.g., keeps the snapshot names in a directory. At time 815 the snapshot ID identified at time 805 is added to the list of snapshots that must be incorporated in the next CP (checkpoint). The list may be in the form of a bitmap, with bit No. 1 for snapshot No. 1, so on and so forth. WAFL may set the corresponding bit to let the CP process know which snapshot number is being created.

At time 820 the CP process starts. This CP process is triggered by the snapshot creation code that started at time 800. At time 825 the CP process starts writing all the modified blocks to disk. At time 830 the FSinfo block of the new stable file system image is written to disk. Thus, the stable file system image of the AFS is created on disk, but needs to replace the previous stable image, i.e. the image at time 800, to become accessible. The file system block number of the Fsinfo block is copied into the slot 0 of the FSinfo array in the Volinfo block only in memory. The Volinfo block will be written to disk later.

At time 835 the structures for accessing the snapmap of the new snapshot are created in memory. The active map of a snapshot image is called 'snapmap'. The snapmap shows which blocks of the file system are being used by the snapshot. The snapmap of a snapshot is in essence a duplicate of the active map of the AFS at this point. At time 840 a file called "summary map file" is created based on the snapmaps of all snapshots. The system may mark the file in the Volinfo block and indicate which snapshots need to be incorporated in the summary map file via the snapmap. This may be in the form of a bitmap, with each bit corresponding to one snapshot, e.g. bit No. 1 for snapshot No. 1, and so forth.

At time 845 the file system block number where the FSinfo block was written at time 830 is copied to the corresponding slot in the FSinfo array for the snapshot that is being created by this CP. For example, if the snapshot that is being created has an ID of 4, and the FSinfo was written to block 1000 of the file system, then slot #4 of the FSinfo array will receive a value of 1000.

At time 850 the Volinfo block is written to disk, e.g., at completion of the CP. As indicated at time 855, by writing the new Volfino to disk, the process of jumping from one file system stable image to the next is complete as well as the creation of the new snapshot. The new snapshot will be identical to the file system stable image created at time 850.

Figure 9:
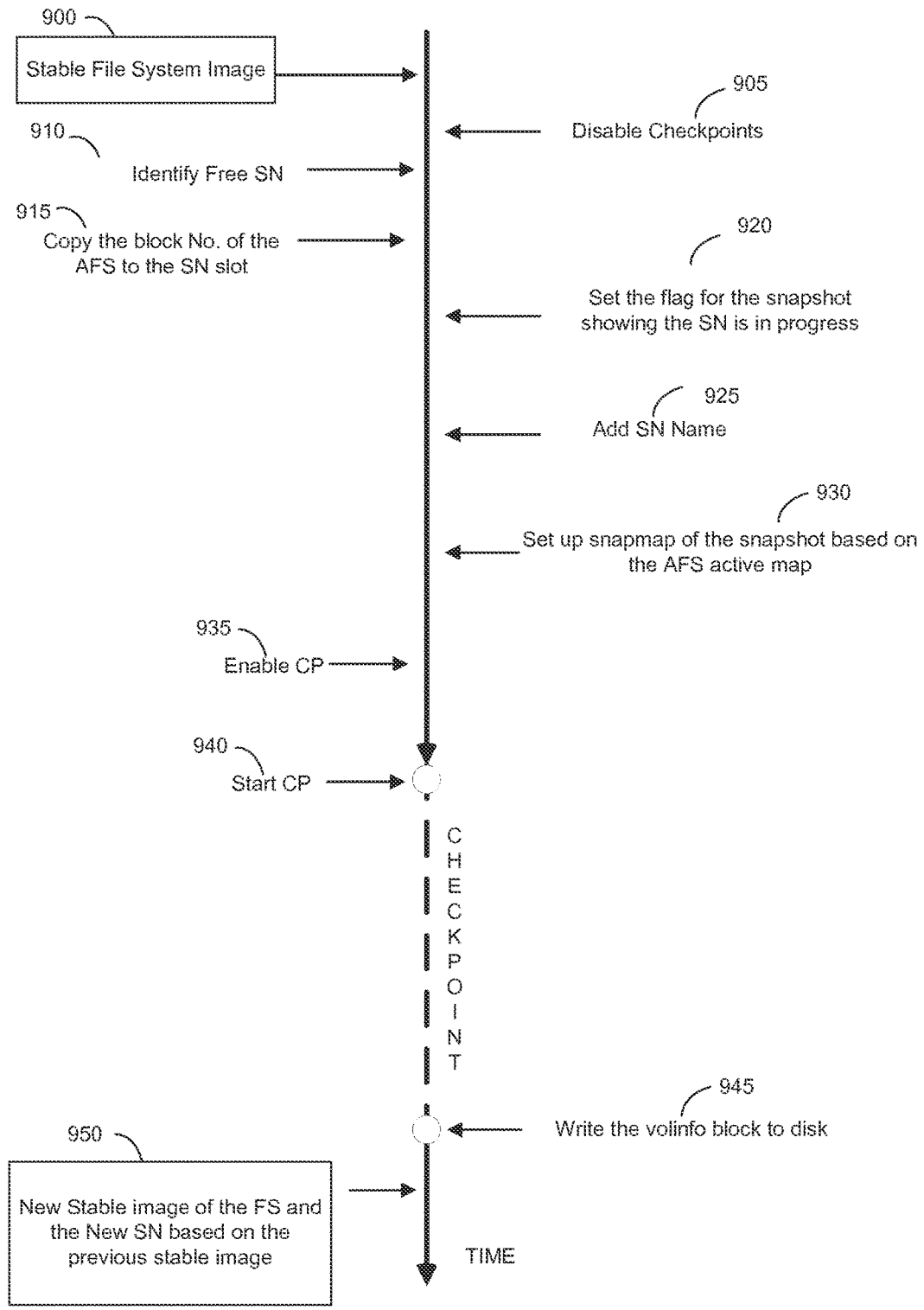
FIG. 9 is an example timeline for a snapshot creation process as may be implemented in some embodiments wherein an on-disk stable image may be converted to a snapshot during mount, rather than at a consistency checkpoint.

FIG. 9 is an example timeline for a snapshot creation as may be implemented in some embodiments wherein an on-disk stable image may be converted to a snapshot during mount, rather than at a consistency checkpoint. Unlike FIG. 8, where the stable file system that becomes the snapshot is the "next", "yet-to-be-created" stable image, in FIG. 9, the snapshot is created from the previous, or current, stable image on-disk.

At time 900 a stable file system image resides on-disk. At time 905 the automatic performance of CP processes may be disabled for this file system. This may help keep the stable file system image unchanged, so that it may be converted "as-is" to a snapshot.

At time 910 the system may find an unused slot in the FSinfo array in the Volinfo block of the file system. At time 915 the system may copy the FSinfo block number of the AFS (e.g., the contents in slot number zero of the FSinfo array in the Volinfo block) to the unused slot found in 910.

At time 920 a file called "summary map file" may be created based on the snapmaps of all snapshots, e.g., in a manner analogous to time 840 in the previous timeline. At 840, the snapmap of the new snapshot is already in memory, because the active map of the AFS is the same as snapmap of the snapshot. In contrast, at 925, the system may read the on-disk snapmap because the snapshot does not yet exist and the system is in the middle of converting the on-disk file system stable image to a snapshot. Moreover the active-map of the AFS could have changed during mount. At time 925 a snapshot name is created by the system and added to the list of snapshots, e.g., similar to step 810.

At time 930 the snapmap of the new snapshot is created in memory. In the previous timeline at time 845 the system used the active map of the AFS that is currently in memory to create the snapshot snapmap. In some embodiments, at time 930 the snapmap may instead be created by re-reading the active map from disk. This may guarantee that none of the changes made to the active map of the AFS will show up in the snapshot that is about to be created based on stable image of step 900.

At time 935 the automated performance of CP processes is re-enabled for this file system. In some embodiments, since all the above steps have modified only in-memory structures and nothing on-disk is modified, the stable image of the file system has not changed so far.

At time 940 a CP may start for this file system. This may start the transition phase of moving the file system to the next stable image. Since all the structures of the new snapshot are already set up in memory to make the on-disk file system image like a snapshot, none of the blocks of that image will be modified.

At time 945 the new Volinfo block may be written to disk and the new stable image of the file system along with the new snapshot may be stored on disk. Since all the changes for creating the snapshot had been incorporated to the Volinfo block of the file system before step 940, the CP that started at 940 may not need to do anything for creating the snapshot. At time 950 a new stable image of the file system and the new snapshot based upon the previous stable image may exist.

Thus, prior systems use checkpoints to create new snapshots and save them on disk when the file system is online/mounted, e.g., whenever a snapshot is going to be created the next stable image of the file system will be the snapshot. In the example embodiment discussed above, however, the system does not use CPs and does not incorporate creating a snapshot in a CP. Instead, the system converts the current on-disk stable image to a snapshot. This approach permits the user to use the snapshot for recovery purposes if necessary.

Some embodiments associated with the approach of FIG. 9 will include additional distinctions from the timeline of FIG. 8. For example, in embodiments implementing aspects of FIG. 9, all the data may be [re-]read from disk from the current on-disk stable image instead of using the AFS-equivalent that is present in the main memory. For example, as mentioned previously, when accessing the snapmap of the new snapshot, the system may load the FSinfo block from disk into the buffer cache and follow the data structures of the file system until reaching the snapmap of the snapshot.

Accordingly, embodiments implementing aspects of FIG. 9 may be able to re-read the information from the current on-disk stable image as checkpoints were disabled for this file system. Absent the disablement, the disk blocks that we are about to be read could have been over-written (e.g., re-used) by previous CPs resulting in reading of the wrong data.

Figure 10:
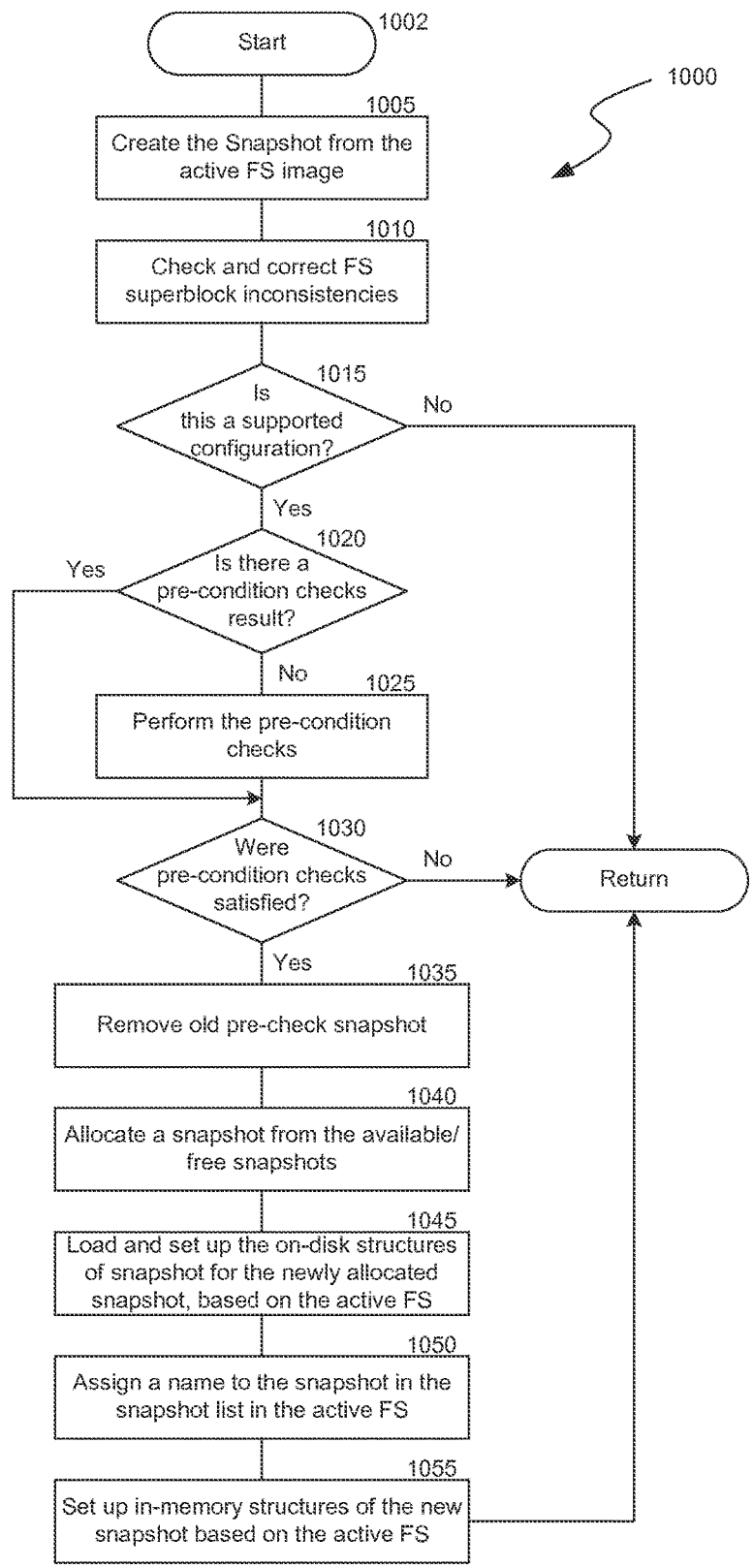
FIG. 10 is a flow diagram illustrating a routine for converting an on-disk file image to a snapshot as may be implemented in some embodiments.

FIG. 10 is a flow diagram illustrating a routine 1000 for converting an on-disk file image to a snapshot as may be implemented in some embodiments. The routine 1000 begins at block 1002. At block 1005, the system may create a snapshot from the active file system image. At block 1010, the system may check and correct file system superblock inconsistencies.

At decision block 1015, the routine 1000 may determine whether the configuration to create the snapshot of the file system is supported. For example, if the operations at block 1010 have introduced unacceptable errors, the routine 1000 may end, deferring to the appropriate remedial action (e.g., notifying the user, attempting a separate repair software suite, etc.).

If the configuration is acceptable, the routine 1000 may proceed to decision block 1020 to determine if precondition checks have been performed. If the checks have not been performed, the routine 1000 may proceed to block 1025 and perform the checks.

If the checks were not passed, then at decision block 1030 the routine 1000 may end, again deferring to the appropriate remedial action (e.g., notifying the user, attempting a separate repair software suite, etc.). In some embodiments, if the checks were passed, then at block 1035, the routine 1000 may remove the old pre-check snapshot.

At block 1040, the routine 1000 may allocate a snapshot from the available/free snapshots. At block 1045, the routine 1000 may load and set up the on-disk structures of snapshots for the newly allocated snapshot based on the active file system.

At block 1050, the routine 1000 may assign a name to the snapshot in the snapshot list in the active file system. For example, file systems may keep a human-readable list of names for their snapshots. These names may also be kept on disk data structures. Again, in some embodiments, because no part of the file system is accessed unless it is checked, this list may be checked for consistency before it is used. The names may be kept in a directory called a 'snapshot directory' or 'snapdir' for short. Each snapshot may have an entry in this directory. Each entry may contain a name and its slot number in the array of snapshots in the super-block of the file system. A proper entry may be constructed and added to the directory.

At block 1055, the routine 1000 may set up an in-memory structure of the new snapshot based on the active file system before ending 1060. At block 1055, in-memory data-structures may be set up to include the snapshot in the snapshot list. For example, these data structures may be used during a block allocation algorithm of the file system to ensure the blocks of the newly created snapshot will not be allocated to the new blocks, and hence the pre-check image of the file system will be preserved.

In some embodiments, some fields may be required to be in the super block of the file system to perform this routine 1000. These fields may be checked and fixed before the snapshot is created and may be used for book-keeping.

If the pre-condition checks were not done (e.g. if the file system was not mounted when the file system check program started), the system may perform the checks in some embodiments. In some embodiments, the Aggregate and all of its Flexible Volumes may have loaded all the parts that are needed for such checks at this point. If the result of a pre-condition check shows a failure, the process may stop here. Examples of such checks may include: availability of sufficient free disk space to create a snapshot, availability of a separate device to store the copy-on-write data if the file system requires such separate device, availability of a free snapshot when the storage system limits the number of snapshots, etc.

If an older snapshot of the pre-check file system image exists and the user has requested to create a new image, the old image may be removed in some embodiments prior to creating a new one. In some embodiments, only one snapshot of the pre-check file system image exists at any given time. In other embodiments, multiple snapshots can coexist.

Snapshot Creation—Handcrafting Snapshots

Creation of a snapshot may differ in many respects from the typical creation of a file system image in many previous systems. For example, the snapshot may be "handcrafted" when mounting aggregates to conform to typical file system image. A "handcrafted" snapshot may be one explicitly specified by the user.

If a user aborts snapshot creation after the first checkpoint on the aggregate, the snapshot may be on disk, similar to other changes of any checkpoint. At mount phase, the loaded portion of file system information may not be enough to create a snapshot as normal snapshots are created. At this phase, the snapshot may not have a name. Assigning a name to the snapshot may be done after the snapdir is loaded, checked for consistency, and repaired.

If handcrafting the snapshot is not successful for any reason, an appropriate message may be issued in some embodiments. If it is successful, the new snapshot name and its ID may be logged with a message (e.g. a WAFL EMS message).

In some embodiments, an option is provided to prevent snapshot creation if a user does not want the snapshot to be created.

In some embodiments, snapshot creation may happen only on aggregates. In some embodiments, an empty slot in the snapshot list may be first identified, in order to create a snapshot. If no such slot is available, a "failed" message may be issued and the system may continue its normal operation.

Snapshot Structure

Certain fields in a snapshot data structure may be used to communicate whether a snapshot is to be created, to be used at mount, for reverting to it at a later time, for checking by the system, etc.

For example, in some embodiments a field may be added to a volume info structure to save the snapshot physical ID. Another bit may also be added to indicate whether or not the snapshot reserve of the volume must be restored to its value before creating a snapshot. A second bit may show whether or not the system tried to increase the snapshot reserve of the aggregate. Accordingly, as an example, encapsulated as a C structure these fields may be depicted as:

```
struct wafl_Vol_info {
    ...
    uint8_t vi_snapiron;
    uint8_t vi_snapiron_reset: 1;
    uint8_t vi_snapiron_inctried: 1;
    ...
};
```

The field 'vi_snapiron' may be initialized to zero, and 'vi_snapiron_reset' and 'vi_snapiron_inctried' may be initialized to 'false' when the aggregate is created or upgraded from an older WAFL version. In some embodiments, the two bits may be used to show which value for a '-backup' command line option was used, and another field may be used to show whether '-use_backup' was used or not as described in greater detail below.

Assigning a Name to a Snapshot

In some embodiments, each snapshot is assigned a name. The name may be assigned after the snapshot passes basic consistency checks, e.g. checking for nameless snapshots. The handcrafted snapshot may occupy one slot in an array of snapshots, until a name is assigned to it in snapdir.

The name of the snapshot may be in the following format: preiron-<ID>. 'ID' may be the physical snapshot ID of a snapshot. For example, this may be an integer number between 1 to 255. In some embodiments, the name may be added to the system in the same way as names are added to the system when snapshots are being created while the aggregate are online (e.g., during a consistency check).

In some embodiments, the system may either delete the name of the old snapshot and add a new name for the new snapshot, or rename the entry of the old snapshot and update the other fields of the name entry to the new one. The snapshot name may be added when the mount is in-progress. In some embodiments, because a checkpoint may not be able to happen before the mount is finished, creating the snapshot and assigning a name to it will be written to disk together in the first checkpoint after mount.

Undoing Snapshot Creation

Undoing a snapshot creation may involve steps to undo the modifications that were made to create the snapshot during mount. This may be accomplished by deleting the snapshot in-line. Deleting the snapshot in-line may clear all the in-core and on-disk information of the snapshot.

Undoing a snapshot may occur for various reasons, e.g., because of space limitations and honoring the space guarantees, or because a name cannot be assigned to the snapshot. In some embodiments, aggregate snapshots may be automatically deleted when either the snapshot reserve of the aggregate is full or the number of aggregate snapshots is more than the maximum allowed (e.g., 10).

Snapshot Deletion Methods

Figure 11:
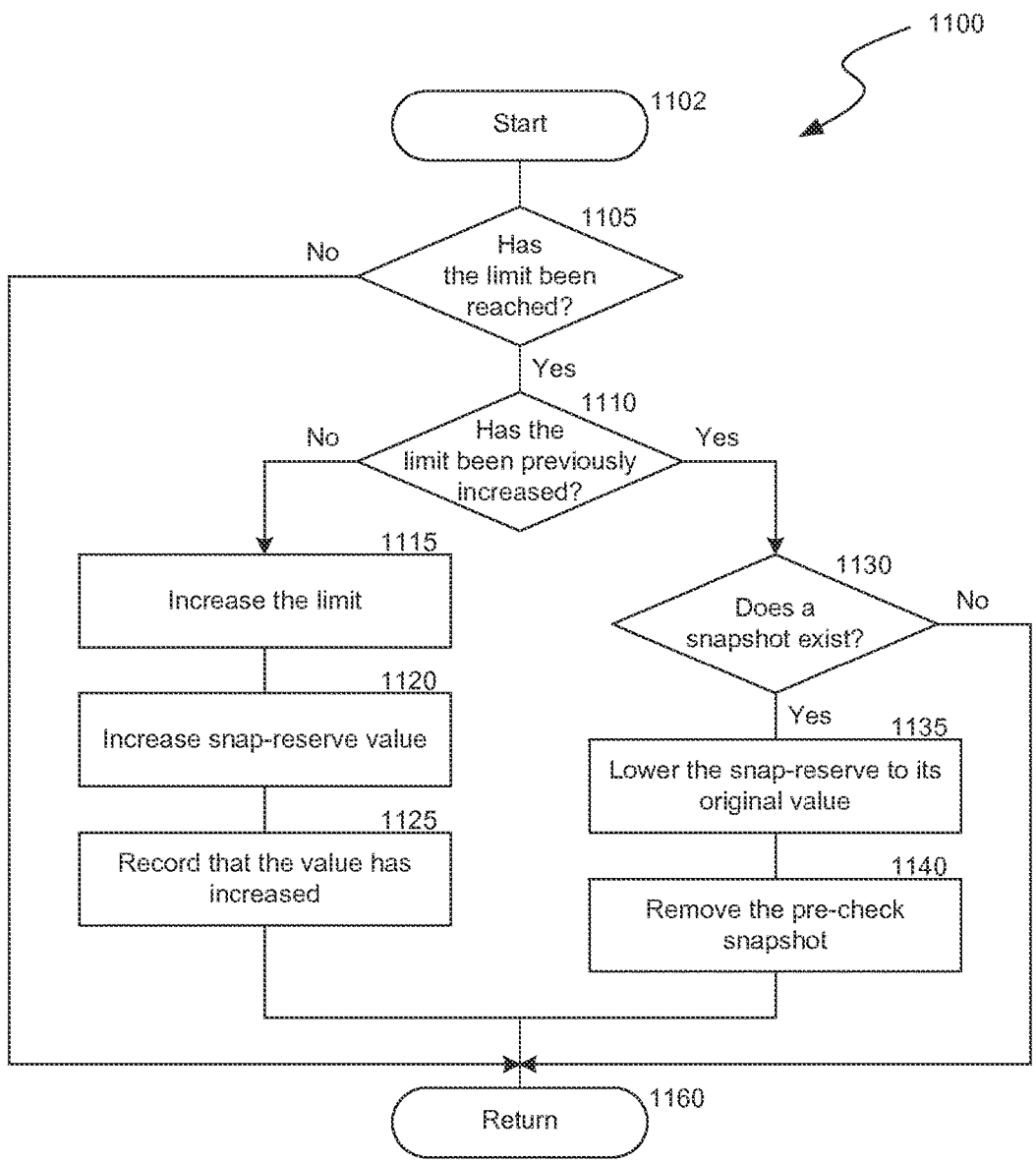
FIG. 11 is a flow diagram illustrating a routing for removing aging or unnecessary snapshots as may be implemented in some embodiments.

FIG. 11 is a flow diagram illustrating a routing for removing aging or unnecessary snapshots as may be implemented in some embodiments. The more the file system changes, the more disk space may be required to store the file system images (active and snapshot(s)). For example, consider an empty file system. First, some files are created and some data is written to those files. Then, a snapshot is created. After creating the snapshot, the data files may be overwritten with new data. At this point, there may be two different file system images on disk: one in the snapshot, and one in the active file system. That may mean that about twice as many blocks for each image is used to keep both images on disk. Different approaches may be chosen to address disk space management of file systems with regard to snapshots. For the purposes of explanation, the example approach described here involves deleting the pre-check image of the file system when there is not enough disk space for it.

Some file systems can set aside a pre-defined amount of disk space for snapshot usage. This value may be called "snapshot reserve", or "snap reserve" for short. When the blocks uniquely used in snapshots reach this limit various actions may be taken. Disk space management of file system software may be used to remove the snapshot when necessary.

Increasing snap-reserve may enable more disk space to be used by snapshots including the pre-check snapshot. As a result, the snapshot can be stored for a long period of time.

The routine 1100 begins at block 1102. At decision block 1105, the system may determine whether the limit for the space or number of snapshots has been reached. If not, there is no need to delete the snapshot and so the routine 1100 may end. Conversely, if the limit has been reached the routine 1100 may proceed to block 1110.

At decision block 1110 the process may determine if the limit has been previously reached (e.g., by referring to a bit flag or other indicator). If not, the routine 1100 may proceed to block 1115. At block 1115 the system may increase the limit to an automatic or user-defined value. At block 1120 the system may increase the "snap-reserve" value. At block 1125, the routine 1100 may record that the value has been increased (e.g. by setting the bit flag).

If, at decision block 1110 the limit has been previously increased, then the routine 1100 may transition to decision block 1130. At block 1130, the system may determine whether a snapshot already exists. If not, there is no reason to delete a snapshot, and so the routine 1100 may end. Conversely, if at least one snapshot does exist, the routine 1100 may proceed to block 1135.

At block 1135, the routine 1100 may lower its snapshot reserve to its original value. At block 1140 the routine 1100 may remove the snapshot created before the consistency check process is performed before the process ends 1160.

Some embodiments implement a complementary approach deleting all the other snapshots before deleting a pre-check snapshot. This approach may assign a higher priority to the pre-check snapshot compared to other snapshots as regards retaining them. In some embodiments, the pre-check snapshot can be removed when it is the last snapshot left in the file system.

In some embodiments, the snapshot can have an expiration time. A subsystem may automatically and/or periodically check the remaining lifetime of the snapshot. When the snapshot expires, it may be automatically deleted. Expiration checks may be performed, e.g., hourly. In some embodiments, the snapshot can be retained for 48 hours before it expires.

Snapshot Reserve

Figure 12:
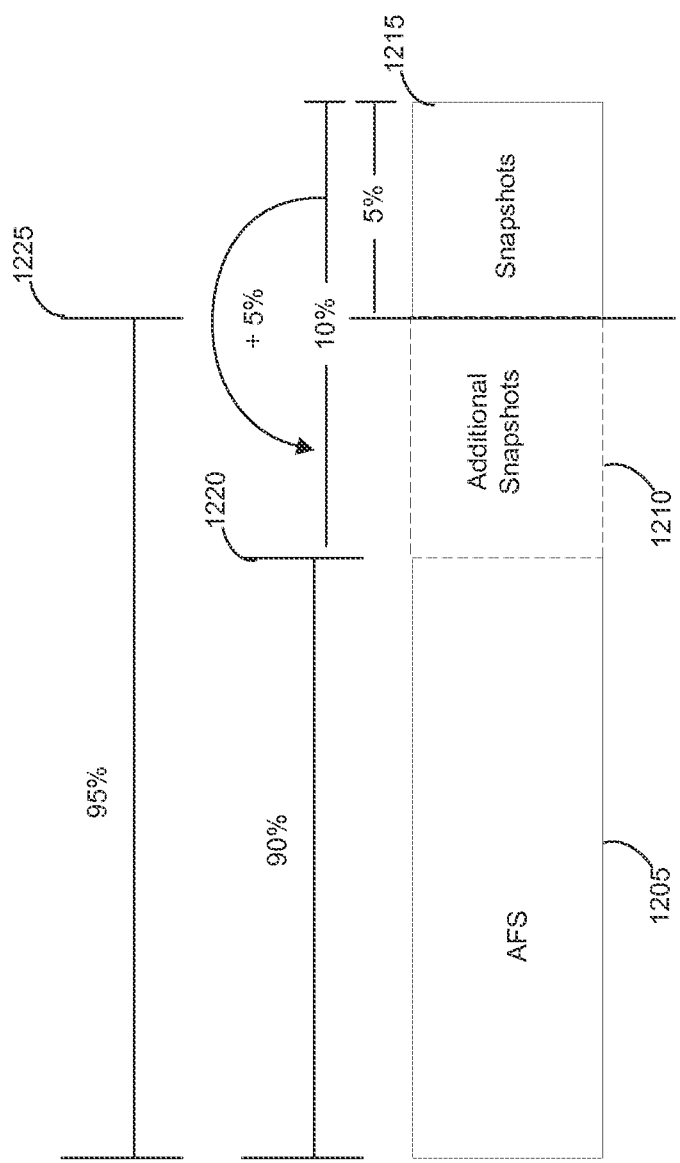
FIG. 12 is a block diagram illustrating the adjustment of an allocated snapshot region within an active file system as implemented in some embodiments.

FIG. 12 is a block diagram illustrating the adjustment of an allocated snapshot region (e.g., a snapshot reserve) within an active file system as implemented in some embodiments. As depicted in this example, an active file system (AFS) 1205 may include a portion 1215 set aside for snapshot images. Portion 1215 may be referred to as a "snap reserve" in some embodiments. Initially, the portion 1215 may comprise only 5% of the active file system 1205 (preserving 95% 1225 of the system for storage and other use). Rather than delete existing snapshots, the system may instead allocate an additional 5% 1210 of the active file system 1205 to accommodate the new snapshot. Accordingly, the "snap reserve" may now encompass 10% of the active file system 1205 to store additional snapshots 1210, leaving 90% 1220 for use by the active file system 1205.

In some embodiments, an aggregate snap reserve will be increased by up to 50% of the free space. In some embodiments, the increase may have a cap. The cap may leave, e.g., at least 5% of the aggregate space free. The changes to the aggregate snap reserve may be undone automatically when a snapshot is deleted or becomes stale, for example, because of snap restore to an older snapshot. In some embodiments, if the user changes the aggregate snapshot reserve after the system increases it, the snapshot reserve may not be changed by the system and may not be set back to its original value upon deletion of the snapshot. This may ensure that the user's choice of snapshot reserve receives precedence to the system logic.

In some embodiments, a maximum number of hours may be enforced for removal. For example, 48 hours may be the maximum number hours a snapshot can be retained. This example time may be premised on the assumption that user data will change enough after 48 hours that from the user-data point of view it does not make sense to go back more than 48 hours in time if the user desires to revert back to the snapshot. During that 48 hour period, file system messages and console messages may be issued periodically asking a user to verify the result of the system, as well as to show the estimated time-to-expire of the snapshot. After that period, the snapshot may be considered expired and may be deleted by the aggregate autodelete.

Resetting Aggregate Snapshot Reserve

In some embodiments, if a system crash occurs after a snap reserve is modified and before the next checkpoint, a snapshot may reappear (because it was not forced to the disk). In this scenario, the snap reserve changes may be performed again. Some embodiments may narrow the time window between the reserve modification and the next checkpoint by triggering a checkpoint after the snap reserve is adjusted.

System Object Verification

Figure 13:
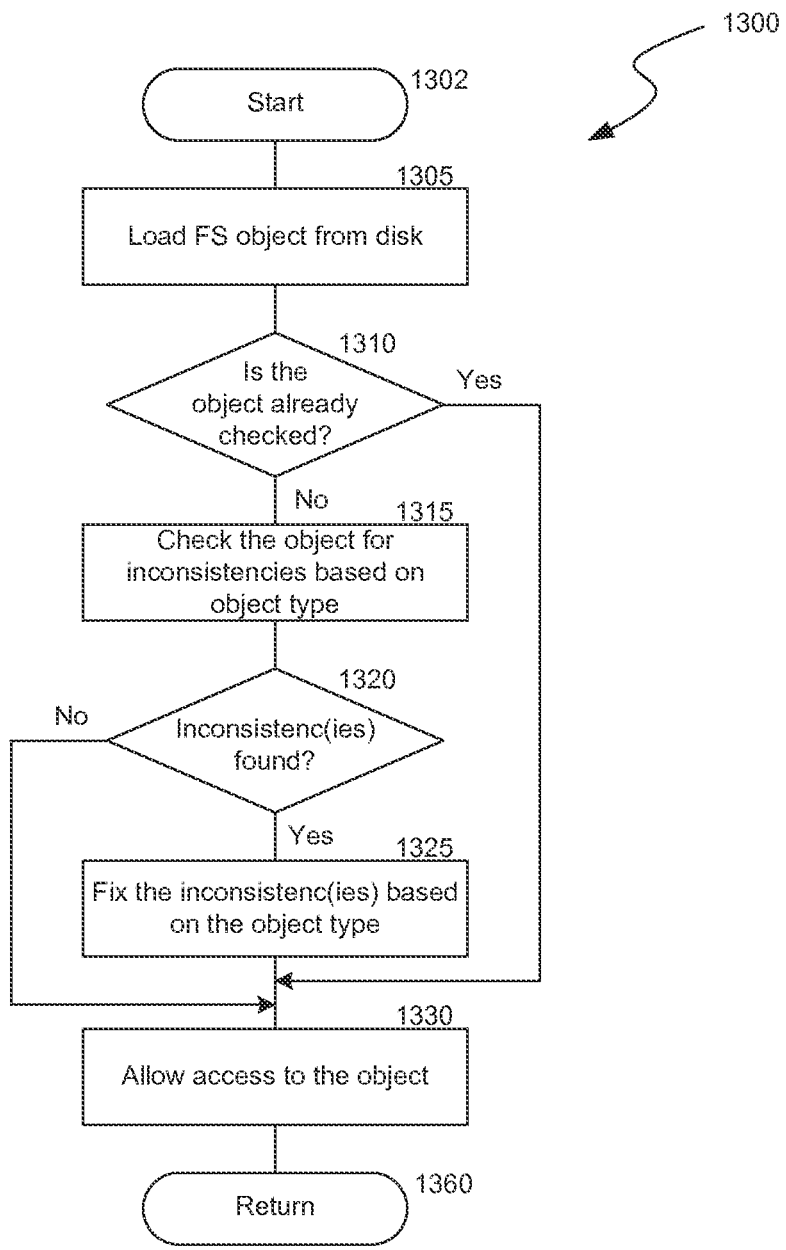
FIG. 13 is a flow diagram illustrating a routine for checking file system objects before allowing access to them in some embodiments.

FIG. 13 is a flow diagram illustrating a routine 1300 for checking file system objects before allowing access to them in some embodiments. This routine 1300 may require that any and all file system objects be checked for consistency and any inconsistency in them be fixed prior to allowing access to them. This requirement may prevent users and processes from accessing invalid data. The file system meta-data may also be checked before it is used. In this manner, inconsistencies may be removed and new modifications to the file system may be based on consistent objects so no more inconsistencies are introduced. Some examples of such file system objects may be: a super-block list of snapshots, a bitmap of allocated blocks in the active file system, a bitmap of the allocated blocks for each snapshot, a bitmap of all allocated blocks in all snapshots, etc.

The routine 1300 begins at block 1302. At block 1305 the routine 1300 may load a file system object from disk. At decision block 1310, the routine 1300 may determine if the object has already been checked. If the object has been checked the routine 1300 may proceed to block 1330. If the object has not been checked, at block 1315, the routine 1300 may check the object for inconsistencies based on the object type. If inconsistencies are found at decision block 1320, the routine 1300 may fix the inconsistencies based on the object type at block 1325. Following these verifications, and possible corrections, at block 1330 the routine 1300 may allow access to the object. If no inconsistencies are found at block 1320, then the routine 1300 may proceed to block 1330 before ending 1360.

Computer System Overview

Figure 14:
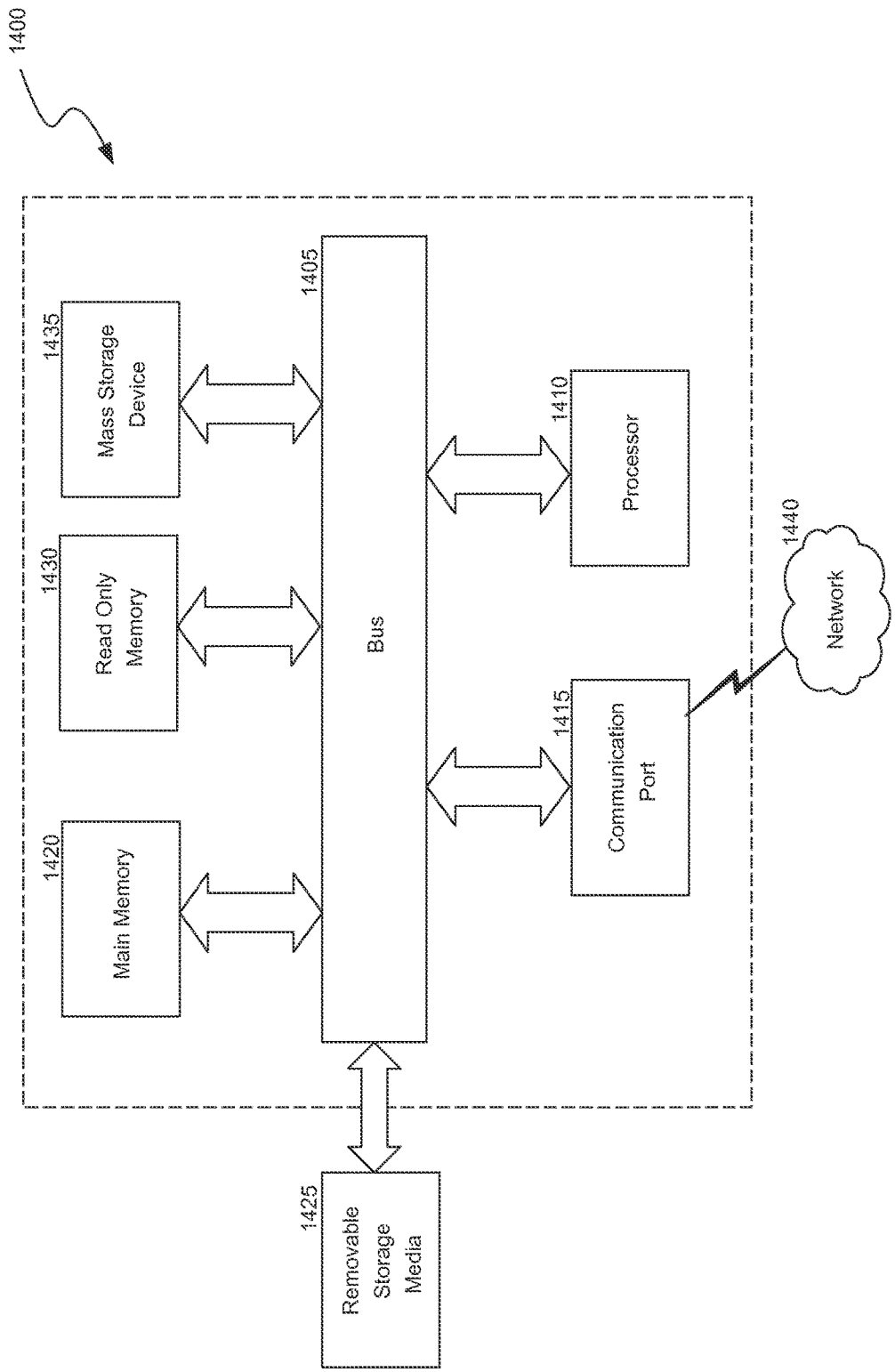
FIG. 14 is a block diagram of a computer system as may be used to implement features of some of the embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 is a block diagram of a computer system 1400 as may be used to implement features of some of the embodiments. Various of the disclosed features may be located on computer system 1400. According to the present example, the computer system includes a bus 1405, at least one processor 1410, at least one communication port 1415, a main memory 1420, a removable storage media 1425, a read only memory 1430, and a mass storage 1435.

Processor(s) 1410 can be any known processor, such as, but not limited to, an Intel® Itanium® or Itanium 2® processor(s), or AMD® Opteron® or Athlon MP® processor(s), or Motorola® lines of processors. Communication port(s) 1415 can be any of an RS-232 port for use with a modem based dialup connection, a 10/100 Ethernet port, or a Gigabit port using copper or fiber. Communication port(s) 1415 may be chosen depending on a network such a Local Area Network (LAN), Wide Area Network (WAN), or any network to which the computer system 1400 connects.

Main memory 1420 can be Random Access Memory (RAM), or any other dynamic storage device(s) commonly known in the art. Read only memory 1430 can be any static storage device(s) such as Programmable Read Only Memory (PROM) chips for storing static information such as instructions for processor 1410.

Mass storage 1435 can be used to store information and instructions. For example, hard disks such as the Adaptec® family of SCSI drives, an optical disc, an array of disks such as RAID, such as the Adaptec family of RAID drives, or any other mass storage devices may be used.

Bus 1405 communicatively couples processor(s) 1410 with the other memory, storage and communication blocks. Bus 1405 can be a PCI/PCI-X or SCSI based system bus depending on the storage devices used.

Removable storage media 1425 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples be construed as limiting, as they are only exemplary embodiments.

Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionality may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method, comprising:
    disabling automatic consistency checkpoint creation for a Log-Structured File System (LSFS);
    performing a precondition check that checks for a valid volume type;
    creating an image of a portion of a file system information block in a region of LSFS memory accessible to a user based upon the precondition check identifying the valid volume type, wherein the creating comprises:
        identifying free memory for the image;
        copying a block number of an active file system to the free memory; and
        establishing a snapshot-related inode in the free memory based upon an active file system active map; and
    making the portion of the file system information block in the region of the LSFS memory available for verification.

2. The method of claim 1, wherein the creating an image comprises re-reading an active map associated with the file system information block from storage.

3. The method of claim 1, further comprising performing a second precondition check that checks for available free disk space.

4. The method of claim 1, further comprising removing a pre-check snapshot.

5. The method of claim 1, further comprising:
    disabling write operations to storage devices associated with the region of LSFS memory accessible to the user prior to storing the image within an active file system; and
    enabling write operations to the storage devices associated with the region of LSFS memory accessible to the user subsequent to storing the image within the active file system.

6. The method of claim 1, comprising:
    mounting the file system information block.

7. The method of claim 1, wherein the active file system active map is an active map of the active file system currently in memory.

8. A computing device, comprising:
    at least one processor; and
    at least one memory storing instructions, the instructions executable by the at least one processor to:
        disable automatic consistency checkpoint creation for a Log-Structured File System (LSFS);
        perform a precondition check that checks for the existence of a snapshot;
        create an image of a portion of a file system information block in a region of LSFS memory accessible to a user based upon the precondition check identifying the existence of the snapshot, comprising:
            identifying free memory for the image;
            copying a block number of an active file system to the free memory; and
            establishing a snapshot-related inode in the free memory based upon an active file system active map; and make the portion of the file system information block in the region of the LSFS memory available for verification.

9. The computing device of claim 8, wherein the creating an image comprises re-reading an active map associated with the file system information block from storage.

10. The computing device of claim 8, the instructions further executable by the at least one processor to perform a second precondition check that checks for a valid volume type.

11. The computing device of claim 8, the instructions further executable by the at least one processor to remove a pre-check snapshot.

12. The computing device of claim 8, the instructions further executable by the at least one processor to:
   disable write operations to storage devices associated with the region of LSFS memory accessible to the user prior to storing the image within an active file system; and
   enable write operations to the storage devices associated with the region of LSFS memory accessible to the user subsequent to storing the image within the active file system.

13. The computing device of claim 8, the instructions further executable by the at least one processor to:
   mount the file system information block.

14. The computing device of claim 8, wherein the active file system active map is an active map of the active file system currently in memory.

15. A non-transitory computer-readable storage comprising instructions executable by at least one processor to:
   disable automatic consistency checkpoint creation for a Log-Structured File System (LSFS);
   perform a precondition check that checks for available free disk space;
   create an image of a portion of a file system information block in a region of LSFS memory accessible to a user based upon the precondition check identifying the available free disk space, comprising:
      identifying free memory for the image;
      copying a block number of an active file system to the free memory; and
      establishing a snapshot-related inode in the free memory based upon an active file system active map; and
   make the portion of the file system information block in the region of the LSFS memory available for verification.

16. The non-transitory computer-readable storage of claim 15, wherein the creating an image comprises re-reading an active map associated with the file system information block from storage.

17. The non-transitory computer-readable storage of claim 15, the instructions further executable by at least one processor to perform a second precondition check that checks for the existence of a snapshot.

18. The non-transitory computer-readable storage of claim 15, the instructions further executable by at least one processor to remove a pre-check snapshot.

19. The non-transitory computer-readable storage of claim 15, the instructions further executable by at least one processor to:
   disable write operations to storage devices associated with the region of LSFS memory accessible to the user prior to storing the image within an active file system; and
   enable write operations to the storage devices associated with the region of LSFS memory accessible to the user subsequent to storing the image within the active file system.

20. The non-transitory computer-readable storage of claim 15, the instructions further executable by at least one processor to mount the file system information block.

21. The non-transitory computer-readable storage of claim 15, wherein the active file system active map is an active map of the active file system currently in memory.

* * * * *